United States Patent
Kim et al.

(10) Patent No.: US 7,474,523 B2
(45) Date of Patent: Jan. 6, 2009

(54) CORNER REINFORCING MEMBER FOR CHASSIS BASE AND DISPLAY MODULE HAVING THE SAME

(75) Inventors: Sok-San Kim, Suwon-si (KR); Ki-Jung Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 472 days.

(21) Appl. No.: 11/209,319

(22) Filed: Aug. 23, 2005

(65) Prior Publication Data

US 2006/0044746 A1    Mar. 2, 2006

(30) Foreign Application Priority Data

Aug. 24, 2004   (KR) ................. 10-2004-0066714

(51) Int. Cl.
   *G06F 1/16*   (2006.01)
(52) U.S. Cl. .................. 361/681; 361/682; 248/917; 248/918; 349/58
(58) Field of Classification Search ............ 312/223.1, 312/223.2; 248/917–923; 361/679–683; 349/58

See application file for complete search history.

(56) References Cited

U.S. PATENT DOCUMENTS

| | | | | |
|---|---|---|---|---|
| 6,466,283 | B1 * | 10/2002 | Peng | 349/58 |
| 6,671,012 | B1 * | 12/2003 | Tanaka | 349/58 |
| 6,683,664 | B2 * | 1/2004 | Noborio | 349/58 |
| 7,142,264 | B2 * | 11/2006 | Choi et al. | 349/58 |
| 7,178,968 | B2 * | 2/2007 | Sugahara et al. | 362/633 |

FOREIGN PATENT DOCUMENTS

| | | |
|---|---|---|
| JP | 11-146305 | 5/1999 |
| JP | 2000-137440 | 5/2000 |
| JP | 2000-183572 | 6/2000 |
| JP | 2000-200978 | 7/2000 |
| JP | 2003-015530 | 1/2003 |
| JP | 2003-131580 | 5/2003 |
| KR | 10 2003 0069250 | 8/2003 |
| KR | 2003-0069250 | * 8/2003 |

OTHER PUBLICATIONS

Notice to Submit Response issued on Apr. 27, 2006 by Korean Intellectual Property Office.

* cited by examiner

*Primary Examiner*—Jayprakash N Gandhi
*Assistant Examiner*—Anthony Q Edwards
(74) *Attorney, Agent, or Firm*—Knobbe Martens Olson & Bear LLP (57) ABSTRACT

A corner reinforcing member, which reinforces a corner portion of a chassis base, and a display module having the reinforcing member are disclosed. In one embodiment, the corner reinforcing member is manufactured by sheet metal working to withstand bending and twisting forces. Also, the corner reinforcing member facilitates the coupling of various designs of display sets to display modules and provides a configuration on which parts can be easily mounted for coupling. Furthermore, the corner reinforcing member can reduce manufacturing costs by reducing the number of parts for coupling. In one embodiment, the corner reinforcing member includes a reinforcing unit that comes into contact with a surface of a chassis base, and a connection unit formed parallel to a bending portion formed on an edge of a chassis base and connected to the reinforcing unit.

19 Claims, 5 Drawing Sheets

CORNER REINFORCING MEMBER FOR CHASSIS BASE AND DISPLAY MODULE HAVING THE SAME

BACKGROUND OF THE INVENTION

This application claims the priority of Korean Patent Application No. 10-2004-0066714, filed on Aug. 24, 2004, in the Korean Intellectual Property Office, the disclosure of which is incorporated herein in its entirety by reference.

1. Field of the Invention

The present invention relates to a reinforcing member for a corner portion of a chassis base of a flat panel display device and a flat panel display module having the same, and more particularly, to a reinforcing member for a chassis base that reinforces a corner portion of the chassis base and a structure in which parts for coupling a display set and a display module can be easily mounted and a display module having the same.

2. Description of the Related Technology

Conventionally, a display module employed in a plasma display device comprises a display panel, a driving circuit substrate including circuits that drive the display panel, and a chassis that supports the display panel and the driving circuit substrate.

Figure 1:
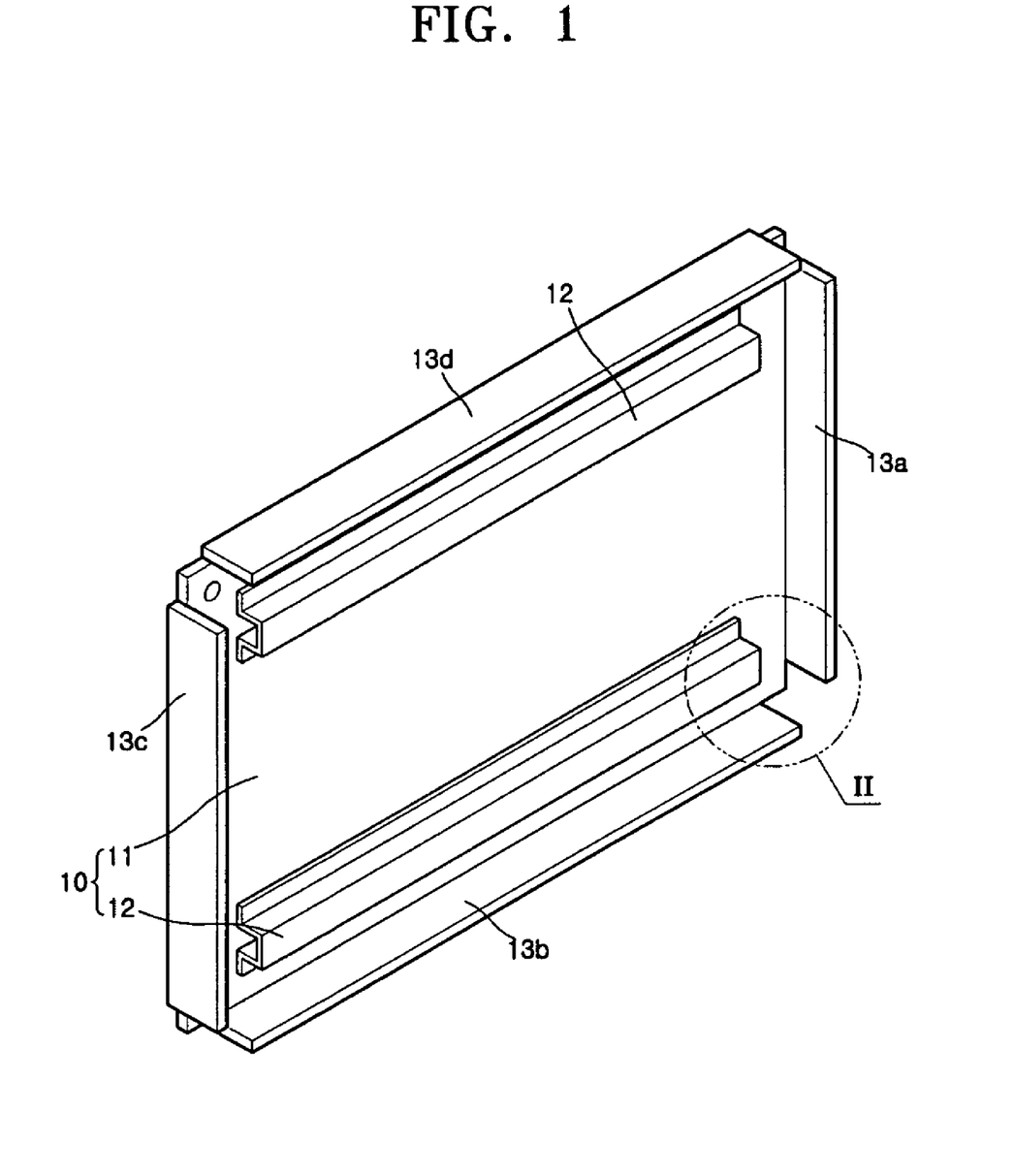
FIG. 1 is a perspective view of a conventional chassis for a display module.

FIG. 1 is a perspective view of a conventional chassis for a display module.

Referring to FIG. 1, a conventional chassis 10 has a rectangular shaped chassis base 11, and includes four bending portions 13a, 13b, 13c, and 13d bent at an end portion of a plate on four end parts, that is, upper, lower, left, and right ends, of the chassis 10. Also, a reinforcing member 12 for reinforcing the strength of the chassis base 11 is mounted in a cross direction.

Figure 2:
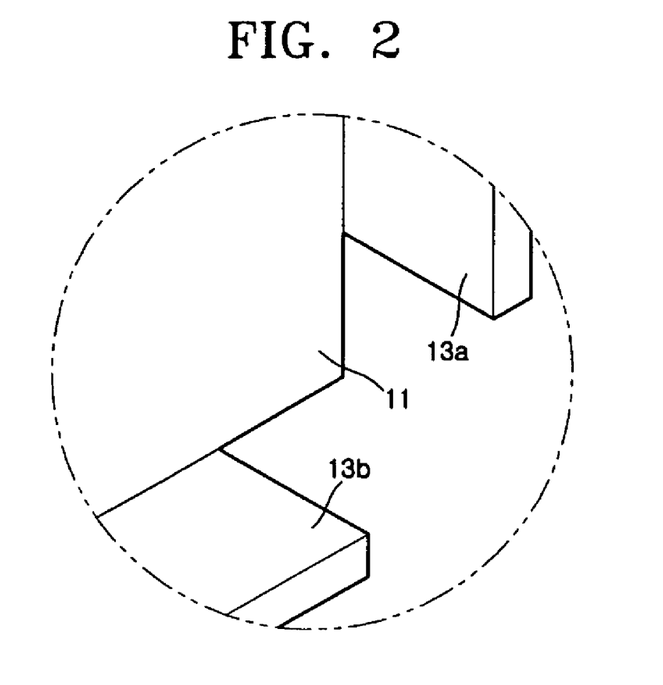
FIG. 2 is a partial perspective view of a magnified portion II of FIG. 1.

FIG. 2 is a partial perspective view of a magnified portion II of FIG. 1.

Referring to FIG. 2, a corner portion, where the bending portions 13a and 13b are facing each other, is weak since the corner portion is disconnected to form a bending portion. Therefore, the corner portion is easily damaged during coupling a display module to a display device.

The display module is coupled with a display set which provides an appearance of a display device. To couple the display module with a display set manufactured separately from the display module, additional parts for connecting the display module to the display set are needed to mount on the chassis. However, in a conventional chassis base, the coupling process is troublesome since the conventional chassis base does not have a configuration for efficiently mounting connection parts and the display set may be manufactured in various designs.

Figure 3:
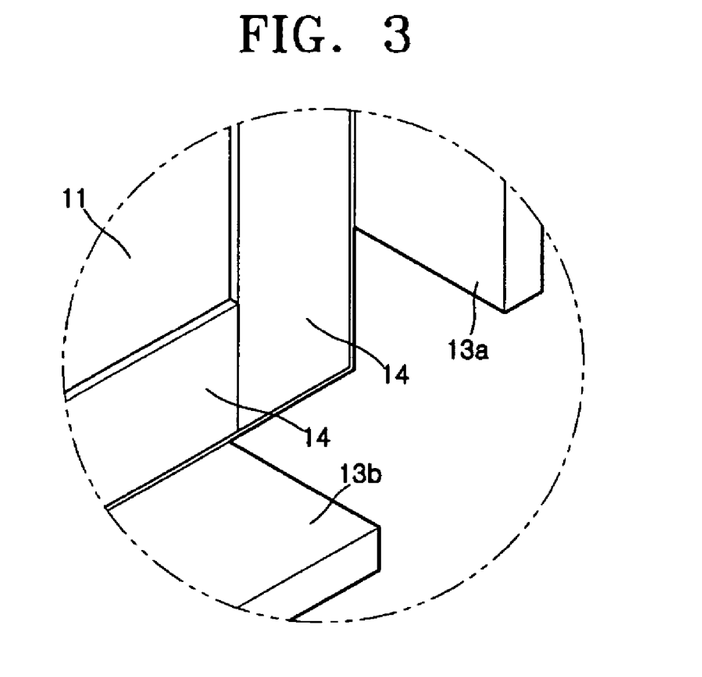
FIG. 3 is a perspective view of a corner portion on which a reinforcing member is installed on the corner portion of FIG. 2.

FIG. 3 is a perspective view of a corner portion on which a reinforcing member is installed on the corner portion of FIG. 2.

Referring to FIG. 3, the corner portion can be reinforced by adding an additional reinforcing member 14 shaped in a plate by covering the corner portion. In this case, the corner portion can be reinforced, but the inconvenience of coupling the display module with the display set in the subsequent process remains.

Therefore, there has been a need to develop a reinforcing member having a new structure that can have a stronger stiffness and be manufactured more efficiently. Further, subsequent processes after coupling a display module with a display set should be more convenient and a display module that employs the reinforcing member needs to be developed.

SUMMARY OF CERTAIN INVENTIVE ASPECTS

One aspect of the present invention provides a corner reinforcing member that reinforces a corner portion of a chassis base and a display module having the reinforcing member wherein the corner reinforcing member is manufactured by sheet metal working, thereby being able to resist bending and twisting loads.

Another aspect of the present invention provides a corner reinforcing member for a chassis base that facilitates coupling of various designs of display sets for display modules by providing a configuration with parts that can be easily mounted for coupling.

Another aspect of the present invention provides a reinforcing member that can reduce manufacturing costs by reducing the number of parts for joining.

Another aspect of the present invention provides a corner reinforcing member for a chassis base, including: a connection unit that come into contact with one of the left and right bending portions of the chassis base and one of the upper and lower bending portions, and a reinforcing portion that comes into contact with a surface of the chassis base and mounted on a lower part of the connection unit.

In one embodiment, the corner reinforcing member may further comprise an ear part protruded outward of the chassis base and be mounted on an upper part of the connection unit.

In one embodiment, the connection unit and the reinforcing unit may be formed in one body by a press processing.

In one embodiment, the reinforcing unit can be coupled with the chassis base by TOX®, screws, or rivets.

In one embodiment, the ear part can be formed of a metal having high electrical conductivity or a conductive film can be formed on a surface of the ear part. Also, the ear part can be formed by an injection molding using a conductive powder or a powder that includes a conductive fine sand.

Another aspect of the present invention provides a display module comprising: a display panel, a driving circuit substrate, and a chassis base that supports the display panel and the driving circuit substrate, wherein the chassis base includes a corner reinforcing member on a corner of the chassis base, the corner reinforcing member includes: a reinforcing unit that comes into contact with the surface of the chassis base, and a connection unit formed parallel to the bending portion formed on an edge of the chassis base and connected to the reinforcing unit.

In one embodiment, the display module may further comprise an ear part protruded outward of the chassis base and be mounted on an upper part of the connection unit.

In one embodiment, the connection unit and the reinforcing unit may be formed in one body by a press processing.

In one embodiment, the reinforcing unit can be coupled with the chassis base by TOX®, screws, or rivets.

In one embodiment, the ear part can be formed of a metal having high electrical conductivity or a conductive film can be formed on a surface of the ear part. Also, the ear part can be formed by an injection molding using a conductive powder or a powder that includes a conductive fine sand.

In one embodiment, the display panel can be a plasma display panel.

BRIEF DESCRIPTION OF THE DRAWINGS

Embodiments of the present invention will be described with reference to the attached drawings.

DETAILED DESCRIPTION OF CERTAIN INVENTIVE EMBODIMENTS

Embodiments of the present invention will now be described more fully with reference to the accompanying drawings in which exemplary embodiments of the invention are shown. Like reference numerals refer to like elements in the drawings of the conventional art and the embodiments of the present invention.

Figure 4:
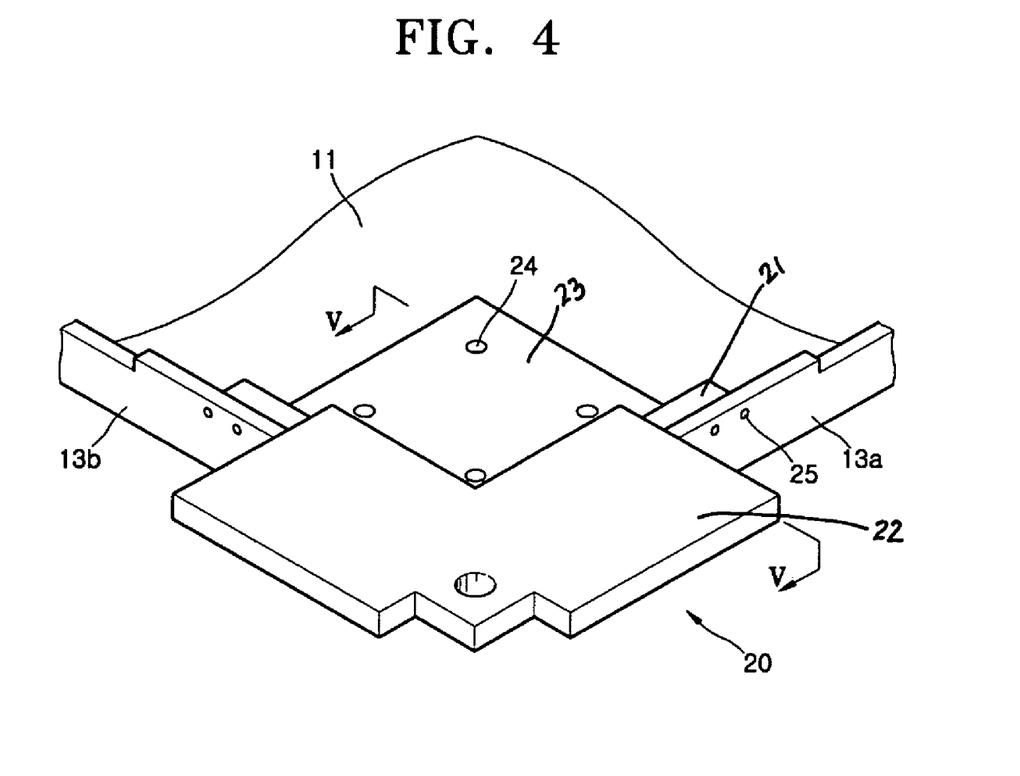
FIG. 4 is a perspective view of a corner reinforcing member for a chassis base according to an embodiment of the present invention.
Figure 5:
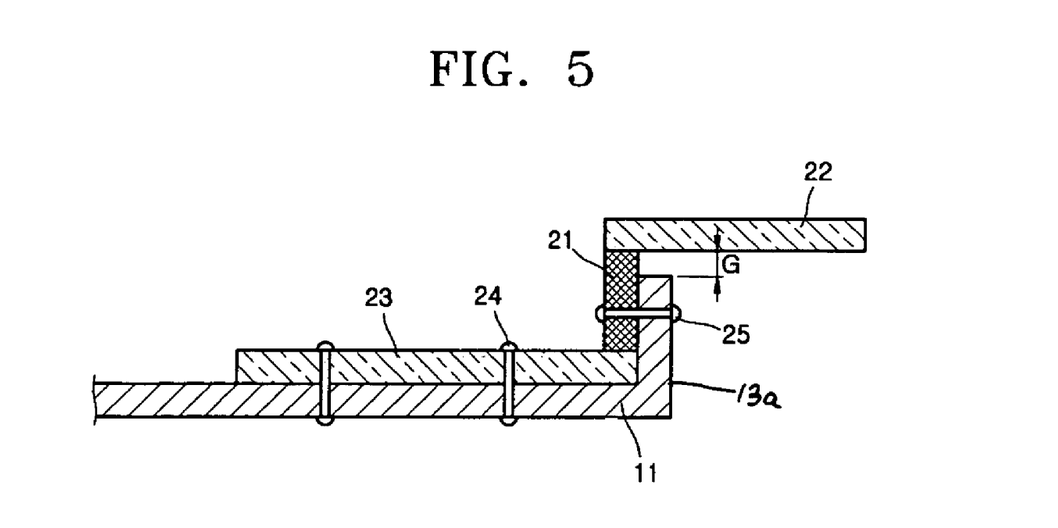
FIG. 5 is a cross-sectional view taken along line V-V of FIG. 4.

FIG. 4 is a perspective view of a corner reinforcing member for a chassis base according to a first embodiment of the present invention, and FIG. 5 is a cross-sectional view taken along line V-V of FIG. 4.

Referring to FIGS. 4 and 5, the reinforcing member for a chassis base 11 (hereinafter, a corner reinforcing member) is mounted on a corner of the chassis base 11. In one embodiment, as depicted in FIG. 5, a corner reinforcing member 20 comprises a connection unit 21, an ear part 22, and a reinforcing unit 23. The connection unit 21 is mounted by contacting two bending portions 13a and 13b facing each other with respect to a corner portion of the chassis base 11. That is, the connection unit 21 contacts one of the left and right bending portions 13a and 13c and one of the upper and lower bending portions 13b and 13d. The ear part 22 is mounted on an upper end of the connection unit 21 and protrudes outwardly from the chassis base 11. The reinforcing unit 23 is mounted on a lower end of the connection unit 21 by contacting a surface of the chassis base 11.

Referring to FIG. 5, in the corner reinforcing member 20 according to the present embodiment, the connection unit 21 may be formed above the ear part 22 at a distance large enough to be mounted on the bending portions 13a and 13b with a predetermined gap G. The gap G can made smaller or be removed, depending on embodiments.

In one embodiment, the connection unit 21, the ear part 22, and the reinforcing unit 23 can be coupled in one body and then, it can be processed including, but not limited to, sheet metal working, rolling, deep drawing, and sintering. Afterward, the connection unit 21, the ear part 22 and the reinforcing unit 23 that are coupled in one body can be mounted on a corner portion of the chassis base 11. In one embodiment, the corner reinforcing member 20 can be press processed in one body, but the corner reinforcing member 20 can be manufactured by bonding, such as welding, plates divided into parts, if the corner reinforcing member 20 has a high thickness.

The coupling of the chassis base 11 and the corner reinforcing member 20 can be achieved by a coupling means 25 that binds the bending portions 13a and 13b and the connection unit 21. In one embodiment, the coupling means 25 can be rivets, TOX®, or screws. In one embodiment, the chassis base 11 and the reinforcing unit 23 can be coupled by a coupling means 24, and the coupling means can also be rivets, TOX®, or screws. In FIG. 5, rivets are used for coupling the chassis base 11 and the connection unit 21, and the chassis base 11 and the reinforcing unit 23, but the present invention is not limited thereto.

In one embodiment, the ear part 22 can be formed of a material having high electrical conductivity. This is advantageous if the ear part 22 is required to be electrically connected to parts of a display set when a display module is coupled with the display set. In one embodiment, the ear part 22 can be manufactured by coating a conductive film on a surface of the ear part 22 or by an injection molding the ear part 22 itself using a conductive powder or a powder that includes conductive fine sand.

Figure 6:
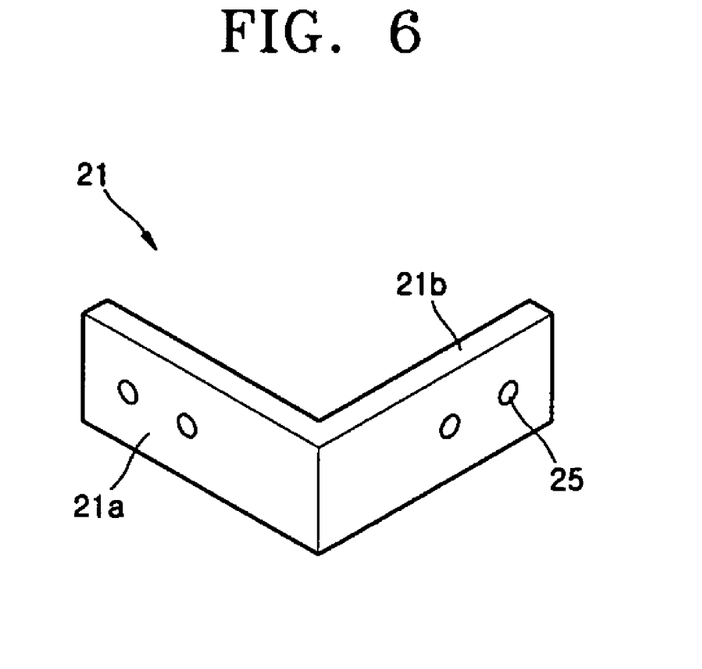
FIG. 6 is a perspective view of a connection unit of a corner reinforcing member for a chassis base.
Figure 7:
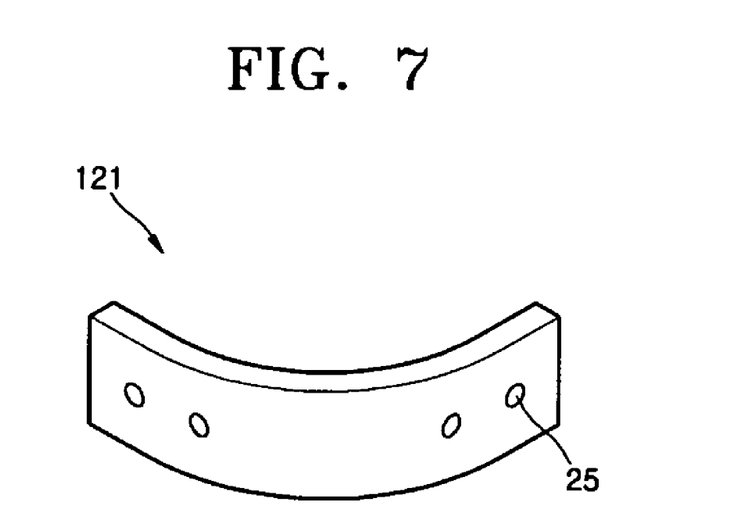
FIG. 7 is a perspective view of another connection unit of a corner reinforcing member for a chassis base.

FIGS. 6 and 7 are perspective views of connection units of a corner reinforcing member for a chassis base. In one embodiment, as depicted in FIG. 6, the connection unit 21 can be manufactured in a coupled state of two plates 21a and 21b with a predetermined angle. In another embodiment, as depicted in FIG. 7, the connection unit 121 can be formed in a rounded shape.

Figure 8:
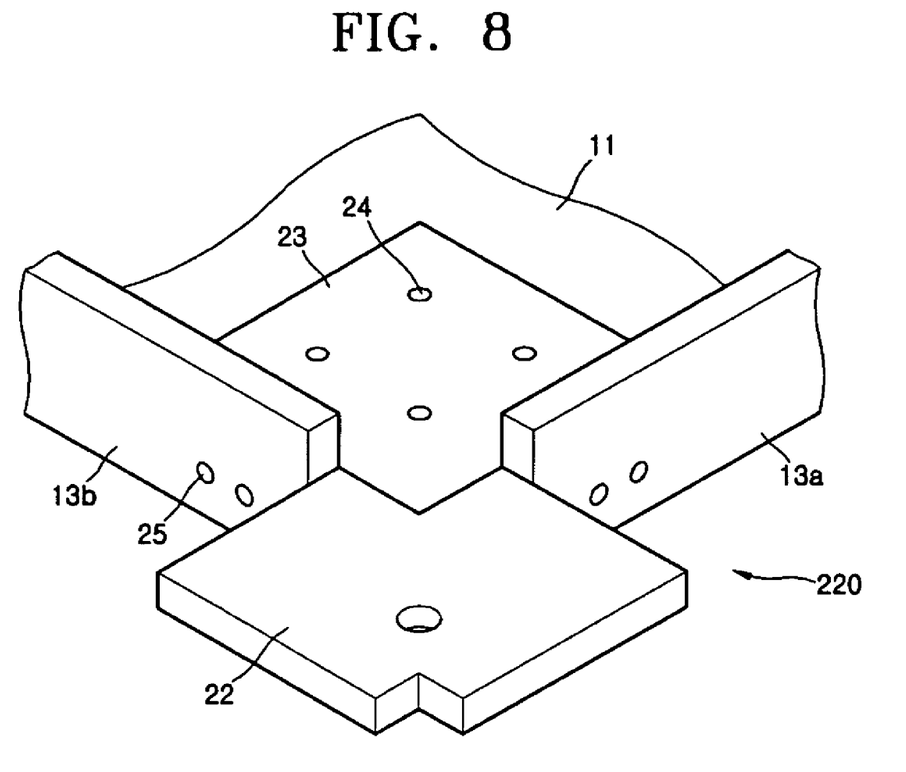
FIG. 8 is a perspective view of a corner reinforcing member according to another embodiment of the present invention.

FIG. 8 is a perspective view of a corner reinforcing member according to a second embodiment of the present invention.

Referring to FIG. 8, in a corner reinforcing member 220 according to the second embodiment of the present invention, the connection unit 21 and the ear part 22 are connected through a space between the two bending portion 13a and 13b formed on a corner portion of the chassis base 11. In the first embodiment, the ear part 22 is disposed so as to cover the bending portions 13a and 13b since the ear part 22 has a greater height than the bending portions 13a and 13b. However, in the present embodiment, the ear part 22 is disposed lower than the bending portions 13a and 13b since the connection unit 21 is formed lower than the bending portions 13a and 13b.

Figure 9:
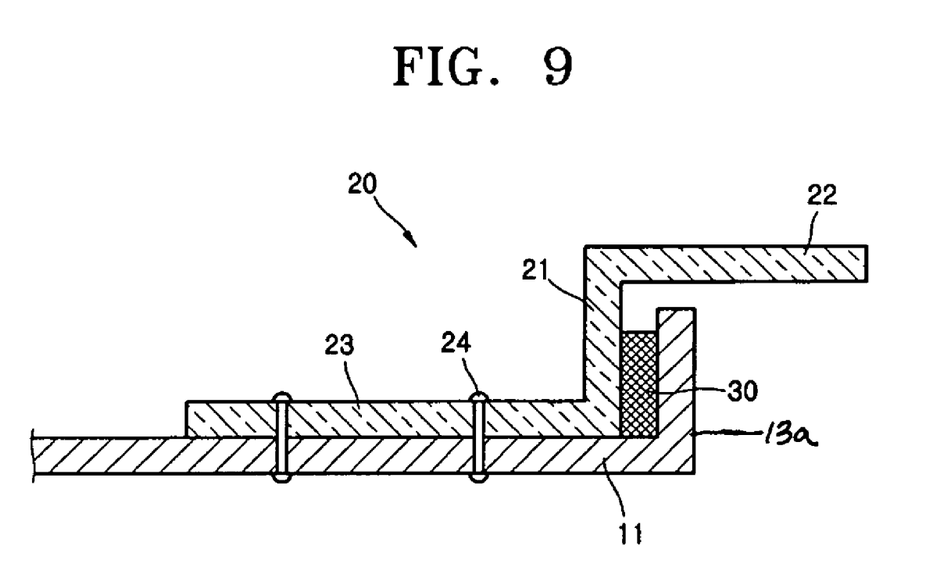
FIG. 9 is a cross-sectional view illustrating another method of coupling the corner reinforcing member for the chassis base of FIG. 4.

FIG. 9 is a cross-sectional view illustrating another method of coupling the corner reinforcing member for the chassis base of FIG. 4.

In one embodiment, as shown in FIG. 9, for mounting the corner reinforcing member 20 of FIG. 5 on the chassis base 11, a spacer 30 can be installed between the connection unit 21 and the bending portions 13a and 13b of the chassis base 11. Alternatively, the corner reinforcing member 20 can be mounted on the chassis base 11 having a predetermined space between the connection unit 21 of the corner reinforcing member 20 and the bending portions 13a and 13b without installing the spacer 30.

In one embodiment, considering the ear part 22 which is being forced by being connected to an outside cover (not shown) that encapsulates the display module, it is desirable to insert the spacer 30 between the connection unit 21 and the bending portions 13a and 13b rather than having a space.

In one embodiment, when using a spacer 30, if there is a size difference between the chassis base 11 and the corner reinforcing member 20 at the coupling portion, a spacer 30 having a suitable size for the space between the connection unit 21 and the bending portions 13a and 13b can be inserted by adjusting the thickness of the spacer 30. Thus, a force being applied to the ear part 22 and the connection unit 21 from the outside can be dispersed with the bending portions 13a and 13b, thereby maintaining the strength of the corner reinforcing member 20.

According to one embodiment of the present invention, the structural stiffness of a corner of a chassis base can be reinforced since a corner reinforcing member may connect portions of bending portions of a corner of a chassis base and a reinforcing unit reinforces the corner portion of the chassis base. Therefore, the thickness of the chassis base can be reduced since the strength of the chassis base can be obtained by the corner reinforcing member. Also, the reduced thickness of the chassis base reduces the manufacturing costs of the chassis base.

Connecting parts can be readily mounted on a display set when the display set is coupled with a display module since the ear part is protruded outward. In particular, the ear part is formed of a conductive material for an electrical connection between connecting parts, depending on embodiments. The display set can be coupled with various display modules with the use of the ear part.

The corner reinforcing member according to one embodiment of the present invention can be readily manufactured by pressing, rolling, and injecting or by welding plates.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A corner reinforcing member for a chassis base of a flat display panel, the reinforcing member comprising:
    a reinforcing unit that comes into contact with a surface of a chassis base;
    a connection unit formed substantially parallel to a bending portion formed on an edge of a chassis base and connected to the reinforcing unit, wherein the parallel relationship is with respect to the planes formed by the connection unit and the bending portion, and wherein the bending portion is substantially perpendicular to the chassis base; and
    an ear part which protrudes outwardly from the chassis base in a first direction and which is mounted on an upper part of the connection unit,
    wherein the connection unit comprises a surface facing the first direction,
    wherein the bending portion comprises a surface facing a second direction substantially opposing the first direction,
    and wherein at least part of the surface of the connection unit contacts at least part of the surface of the bending portion.

2. The corner reinforcing member of claim 1, further comprising a coupling member configured to couple the connection unit and the bending portion via the contacted surface.

3. The corner reinforcing member of claim 2, wherein the coupling member comprises one of the following: a TOX®, a screw and a rivet.

4. The corner reinforcing member of claim 1, wherein the connection unit and the reinforcing unit are formed in one body by sheet metal working.

5. The corner reinforcing member of claim 1, wherein the reinforcing unit is coupled with the chassis base by TOX®, screws, or rivets.

6. The corner reinforcing member of claim 1, wherein the ear part is formed of a metal having high electrical conductivity.

7. The corner reinforcing member of claim 1, further comprising a conductive film formed on a surface of the ear part.

8. The corner reinforcing member of claim 1, wherein the ear part is manufactured by an injection molding using a conductive powder or a powder that includes a conductive fine sand.

9. A corner reinforcing member for a chassis base of a flat display panel, the reinforcing member comprising:
    a reinforcing unit that comes into contact with a surface of a chassis base; and
    a connection unit formed substantially parallel to a bending portion formed on an edge of a chassis base and connected to the reinforcing unit, wherein the parallel relationship is with respect to the planes formed by the connection unit and the bending portion.
    wherein a predetermined gap is formed between the connection unit and the bending portion, and wherein the reinforcing member further comprises a spacer that fills the gap.

10. A flat panel display module, comprising:
    a display panel;
    a driving circuit substrate; and
    a chassis base that supports the display panel and the driving circuit substrate, wherein
    the chassis base includes a corner reinforcing member on a corner of the chassis base, and the corner reinforcing member includes:
        a reinforcing unit that comes into contact with the surface of the chassis base; and
        a connection unit formed substantially parallel to a bending portion formed on an edge of the chassis base and connected to the reinforcing unit, wherein the parallel relationship is with respect to the planes formed by the connection unit and the bending portion, and wherein the bending portion is substantially perpendicular to the chassis base,
    wherein the connection unit comprises a surface facing a first direction, wherein the first direction extends outwardly from the chassis base,
    wherein the bending portion comprises a surface facing a second direction substantially opposing the first direction;
    and wherein at least part of the surface of the connection unit contacts at least part of the surface of the bending portion.

11. The display module of claim 10, further comprising an ear part which protrudes outwardly from the chassis base and which is mounted on an upper part of the connection unit.

12. The display module of claim 10, further comprising a coupling member configured to couple the connection unit and the bending portion via the contacted surface.

13. The display module of claim 10, wherein the connection unit and the reinforcing unit are formed in one body by a press processing.

14. The display module of claim 12, wherein the coupling member comprises one of the following: a TOX®, a screw and a rivet.

15. The display module of claim 10, wherein the display panel is a plasma display panel.

16. The display module of claim 11, wherein the ear part is formed of a metal having high electrical conductivity.

17. The display module of claim 11, further comprising a conductive film formed on a surface of the ear part.

18. The display module of claim 11, wherein the ear part is manufactured by an injection molding using a conductive powder or a powder that includes a conductive fine sand.

19. A flat panel display module, comprising:
- a display panel;
- a driving circuit substrate; and
- a chassis base that supports the display panel and the driving circuit substrate, wherein
- the chassis base includes a corner reinforcing member on a corner of the chassis base, and the corner reinforcing member includes:
  - a reinforcing unit that comes into contact with the surface of the chassis base; and
  - a connection unit formed substantially parallel to the bending portion formed on an edge of the chassis base and connected to the reinforcing unit, wherein the parallel relationship is with respect to the planes formed by the connection unit and the bending portion, wherein a predetermined gap is formed between the connection unit and the bending portion, and wherein the reinforcing member further comprises a spacer that fills the gap.

* * * * *

UNITED STATES PATENT AND TRADEMARK OFFICE
CERTIFICATE OF CORRECTION

PATENT NO. : 7,474,523 B2  Page 1 of 1
APPLICATION NO. : 11/209319
DATED : January 6, 2009
INVENTOR(S) : Kim et al.

It is certified that error appears in the above-identified patent and that said Letters Patent is hereby corrected as shown below:

| Column | Line | Description of Error |
|---|---|---|
| 6 | 18 | In Claim 9, change "portion." to --portion,--. |
| 6 | 45-46 | In Claim 10, change "direction;" to --direction,--. |

Signed and Sealed this

Eleventh Day of August, 2009

David J. Kappos
*Director of the United States Patent and Trademark Office*